US010781701B2

(12) United States Patent
Arai

(10) Patent No.: US 10,781,701 B2
(45) Date of Patent: Sep. 22, 2020

(54) IMPELLER FOR ROTARY MACHINE, COMPRESSOR, FORCED INDUCTION DEVICE, AND METHOD FOR MANUFACTURING IMPELLER FOR ROTARY MACHINE

(71) Applicant: MITSUBISHI HEAVY INDUSTRIES ENGINE & TURBOCHARGER, LTD., Sagamihara-shi, Kanagawa (JP)

(72) Inventor: Takashi Arai, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 207 days.

(21) Appl. No.: 16/088,254

(22) PCT Filed: Jun. 1, 2016

(86) PCT No.: PCT/JP2016/066201
§ 371 (c)(1),
(2) Date: Sep. 25, 2018

(87) PCT Pub. No.: WO2017/208390
PCT Pub. Date: Dec. 7, 2017

(65) Prior Publication Data
US 2020/0116032 A1    Apr. 16, 2020

(51) Int. Cl.
*F01D 5/28* (2006.01)
*F04D 29/28* (2006.01)
(Continued)

(52) U.S. Cl.
CPC .............. *F01D 5/288* (2013.01); *B24C 1/10* (2013.01); *C22F 1/04* (2013.01); *C23C 18/182* (2013.01);
(Continued)

(58) Field of Classification Search
CPC .... B24C 1/10; C22F 1/04–057; B23P 15/006; C23C 18/182; C23C 18/1806; C23C 18/16–1698; F02C 6/12
See application file for complete search history.

(56) References Cited

U.S. PATENT DOCUMENTS 4,761,346 A  *  8/1988  Naik ....................... C23C 28/00
                                                    428/627
5,545,268 A  *  8/1996  Yashiki .................... C25D 5/48
                                                    148/518
(Continued)

FOREIGN PATENT DOCUMENTS

CN    104421171 A  *  3/2015  ........... F04D 19/042
EP    1 809 907 A1    7/2007
(Continued)

OTHER PUBLICATIONS

Office Action dated Oct. 10, 2019 in counterpart European Application No. 16 904 015.1.
(Continued)

*Primary Examiner* — Michael Lebentritt
*Assistant Examiner* — Topaz L. Elliott
(74) *Attorney, Agent, or Firm* — Birch, Stewart, Kolasch & Birch, LLP

(57) ABSTRACT

The impeller comprises: an impeller body (21) which includes a surface part (27) formed to a fixed depth (D) from a surface (21a) thereof, and which is made of Al or an Al alloy; and an Ni—P-based electroless-plated film (23) covering the surface (21a) of the impeller body (21), wherein the surface part (27) has a first compressive residual stress (P1).

19 Claims, 6 Drawing Sheets

(51) Int. Cl.
F01D 5/04 (2006.01)
C23C 18/32 (2006.01)
B24C 1/10 (2006.01)
C22F 1/04 (2006.01)
B23P 15/00 (2006.01)
C23C 18/18 (2006.01)

(52) U.S. Cl.
CPC .......... *C23C 18/1806* (2013.01); *C23C 18/32* (2013.01); *F01D 5/048* (2013.01); *F01D 5/286* (2013.01); *F04D 29/284* (2013.01); *B23P 15/006* (2013.01)

(56) References Cited

U.S. PATENT DOCUMENTS

| | | |
|---|---|---|
| 2005/0056013 A1 | 3/2005 | Furman et al. |
| 2008/0008595 A1 | 1/2008 | McKenzie |
| 2010/0304179 A1* | 12/2010 | Facchini .................. C25D 3/12 428/615 |
| 2010/0319344 A1 | 12/2010 | McKenzie |
| 2011/0061404 A1* | 3/2011 | Ishizuka .................. F25B 9/14 62/6 |
| 2014/0345559 A1* | 11/2014 | Minaki ............... C23C 18/1806 123/193.6 |
| 2016/0230594 A1* | 8/2016 | Yamauchi ............. C25D 7/008 |
| 2018/0045215 A1* | 2/2018 | Arai ..................... F04D 29/284 |

FOREIGN PATENT DOCUMENTS

| | | | |
|---|---|---|---|
| EP | 2 522 377 A1 | 11/2012 | |
| EP | 2 752 502 A1 | 7/2014 | |
| JP | 8-39432 A | 2/1996 | |
| JP | 9-303289 A | 11/1997 | |
| JP | 2992134 B2 | 12/1999 | |
| JP | 2000-230544 A | 8/2000 | |
| JP | 2008-519933 A | 6/2006 | |
| JP | 2010-202900 A | 9/2010 | |
| JP | 2014-163345 A | 9/2014 | |
| WO | WO-0144770 A1 * | 6/2001 | ............. G01L 3/103 |
| WO | WO 2006/051285 a1 | 5/2006 | |
| WO | WO-2006126993 A1 * | 11/2006 | ........... F04D 29/289 |
| WO | WO-2013031483 A1 * | 3/2013 | ............... C25D 5/40 |

OTHER PUBLICATIONS

International Search Report (form PCT/ISA/210) for International Application No. PCT/JP2016/066201, dated Jul. 26, 2016, with English Translation.
Written Opinion of the International Searching Authority (Form PCT/ISA/237) for International Application No. PCT/JP2016/066201, dated Jul. 26, 2016, with English Translation.

* cited by examiner

IMPELLER FOR ROTARY MACHINE, COMPRESSOR, FORCED INDUCTION DEVICE, AND METHOD FOR MANUFACTURING IMPELLER FOR ROTARY MACHINE

TECHNICAL FIELD

The present invention relates to an impeller for a rotary machine, a compressor including the impeller for a rotary machine, a forced induction device including the impeller for a rotary machine, and a method of manufacturing the impeller for a rotary machine.

BACKGROUND ART

In recent years, an exhaust gas recirculation (EGR) system has been frequently employed in internal combustion engines for an automobile, particularly, a diesel engine, and the like. Since a part of exhaust gas is introduced into a compressor of a forced induction device that is provided in an internal combustion engine employing an EGR system, erosion caused by droplets included in exhaust gas is likely to occur on a compressor impeller.

For this reason, a method of forming a Ni—P-based plated film on a compressor impeller, which is manufactured with Al, Al alloy, or the like, has been performed as a countermeasure against erosion and a countermeasure against corrosion.

PTL 1 discloses that electroless Ni—P-based alloy plating is performed on a compressor impeller of a forced induction device provided in a marine diesel engine employing an EGR system to improve erosion resistance and corrosion resistance.

CITATION LIST

Patent Literature

[PTL 1] Japanese Unexamined Patent Application Publication No. 2014-163345

SUMMARY OF INVENTION

Technical Problem

Incidentally, a stress that is caused by a centrifugal force generated due to high-speed rotation and a stress that is caused by a difference between the thermal elongation of a Ni—P-based electroless-plated film and the thermal elongation of Al alloy are generated in the compressor impeller (one of impellers for a rotary machine) of the forced induction device.

For this reason, the Ni—P-based electroless-plated film requires not only erosion resistance but also crack resistance (fatigue strength) and peeling resistance (interface strength).

However, in a case in which a Ni—P-based plated film is formed on the surface of the compressor impeller by a Ni—P-based electroless-plating solution that is an inexpensive general-purpose product, a crack is developed to an impeller body that is a base material when the crack is generated in the Ni—P-based plated film. For this reason, there is a concern that the fatigue strength of the compressor impeller may significantly deteriorate.

Particularly, in a case in which a centrifugal stress and a thermal stress, which are associated with a change in a turbo-rotational speed at the time of operation of the turbocharger, are repeatedly applied to a compressor impeller for a turbocharger, there is a concern that brokenness occurs in the Ni—P-based electroless-plated film at an early stage. For this reason, there is a possibility that the fatigue life of a blade may deteriorate.

At an examination state before the making of the present invention, the inventors thought out the use of a Ni—P-based electroless-plating solution, which allows the quality, structure, and the like of a Ni—P-based electroless-plated film to satisfy predetermined conditions, in terms of suppressing the deterioration of the fatigue strength of the compressor impeller.

However, in a case in which the Ni—P-based electroless-plating solution is used to solve the above-mentioned problems, it is necessary to frequently change a plating solution into a new Ni—P-based electroless-plating solution and to strictly manage plating conditions.

For this reason, there is a concern that new problems of an increase in costs and the deterioration of productivity may be generated.

Accordingly, the present invention provides an impeller for a rotary machine, a compressor, a forced induction device, and a method of manufacturing the impeller for a rotary machine that can suppress an increase in the costs of the impeller for a rotary machine, can suppress the deterioration of productivity of the impeller for a rotary machine, and can suppress the development of a crack, which is generated in a Ni—P-based electroless-plated film, to an impeller body (base material).

Solution to Problem

An impeller for a rotary machine according to a first aspect of the present invention includes an impeller body that includes a surface portion provided so as to have a fixed depth from a surface thereof and is made of Al or Al alloy and a Ni—P-based electroless-plated film that covers the surface of the impeller body, and the surface portion has a first compressive residual stress.

Since the surface portion of the impeller body of the impeller for a rotary machine having the above-mentioned structure has the first compressive residual stress, the development of a crack to the impeller body can be suppressed in a case in which the crack is generated in the Ni—P-based electroless-plated film.

Accordingly, it is not necessary to frequently change a plating solution into a new Ni—P-based electroless-plating solution and to strictly manage plating conditions in a case in which a Ni—P-based electroless-plating solution (a unique plating solution not available in the market), which allows the quality, structure, and the like of the Ni—P-based electroless-plated film to satisfy predetermined conditions, is used to solve the above-mentioned problems.

That is, since an inexpensive general-purpose Ni—P-based electroless-plating solution can be used, an increase in the costs of the impeller for a rotary machine can be suppressed, the deterioration of productivity of the impeller for a rotary machine can be suppressed, and the development of the crack, which is generated in the Ni—P-based electroless-plated film, to the impeller body can be suppressed.

Further, in an impeller for a rotary machine according to a second aspect of the present invention, the Ni—P-based electroless-plated film may have a second compressive residual stress.

According to this structure, the generation of a crack in the Ni—P-based electroless-plated film can be suppressed, and the growth of a crack can be suppressed in a case in which the crack is generated in the Ni—P-based electroless-plated film. Accordingly, the development of the crack, which is generated in the Ni—P-based electroless-plated film, to the impeller body can be suppressed.

Furthermore, in an impeller for a rotary machine according to a third aspect of the present invention, an absolute value of the first compressive residual stress may be 300 MPa or more and the depth of the surface portion from the surface of the impeller body may be equal to or larger than 0.2 mm and less than 0.4 mm.

When the absolute value of the first compressive residual stress is set to 300 MPa or more as described above, the sufficient fatigue life of a blade of the impeller for a rotary machine can be obtained in a case in which the impeller for a rotary machine is applied to a turbocharger.

Further, when the depth of the surface portion is set to be equal to or larger than 0.2 mm and less than 0.4 mm, the amount of deformation of a blade can be made to be in an allowable range in a case in which the impeller for a rotary machine is applied to a turbocharger.

Moreover, in an impeller for a rotary machine according to a fourth aspect of the present invention, the impeller body may include a blade inlet-root portion and a blade outlet-root portion and each of the blade inlet-root portion and the blade outlet-root portion may include the surface portion.

When the blade inlet-root portion and the blade outlet-root portion of the impeller body include the surface portions as described above, it is possible to suppress damage to the blade inlet-root portion and the blade outlet-root portion where a crack is likely to be generated in the Ni—P-based electroless-plated film.

Further, in an impeller for a rotary machine according to a fifth aspect of the present invention, a concentration of P contained in the Ni—P-based electroless-plated film may be in the range of 5 wt % to 10 wt %.

When the concentration of P contained in the Ni—P-based electroless-plated film is set in the range of 5 wt % to 10 wt % as described above, high Vickers hardness can be obtained and high crack resistance can be obtained.

Accordingly, the generation of a crack in the Ni—P-based electroless-plated film can be suppressed.

Furthermore, in an impeller for a rotary machine according to a sixth aspect of the present invention, a hardness of the Ni—P-based electroless-plated film may be in the range of 500 HV to 700 HV.

For example, in a case in which the hardness of the Ni—P-based electroless-plated film is less than 500 HV, there is a concern that sufficient erosion resistance may not be obtained. Further, in a case in which the hardness of the Ni—P-based electroless-plated film is higher than 700 HV, there is a concern that sufficient crack resistance may not be obtained.

Accordingly, when the hardness of the Ni—P-based electroless-plated film is set in the range of 500 HV to 700 HV, sufficient erosion resistance and sufficient crack resistance can be obtained.

In an impeller for a rotary machine according to a seventh aspect of the present invention, a thickness of the Ni—P-based electroless-plated film may be in the range of 15 µm to 60 µm.

For example, n a case in which the thickness of the Ni—P-based electroless-plated film is less than 15 µm, there is a concern that sufficient erosion resistance and sufficient crack resistance may not be obtained. Further, in a case in which the thickness of the Ni—P-based electroless-plated film is larger than 60 µm, time required for electroless plating treatment is increased. For this reason, there is a concern that costs may be increased.

Accordingly, when the thickness of the Ni—P-based electroless-plated film is set in the range of 15 µm to 60 µm, the increase in costs can be suppressed and sufficient erosion resistance and sufficient crack resistance can be obtained.

Furthermore, in an impeller for a rotary machine according to an eighth aspect of the present invention, the impeller body may be an impeller body for a forced induction device.

When the impeller body is used as a compressor impeller of a forced induction device, which rotates an impeller at a high speed, as described above, the erosion resistance of the forced induction device can be improved, the development of a crack can be suppressed, and the life of the forced induction device can be increased.

A compressor according to a ninth aspect of the present invention may include the impeller for a rotary machine according to the first to eighth aspects of the present invention.

According to this structure, since the compressor includes the impeller for a rotary machine that has high erosion resistance and a crack suppression function, the life of the compressor can be increased.

Further, a forced induction device according to a tenth aspect of the present invention may include the compressor according to the ninth aspect of the present invention and a turbine that drives the compressor.

According to this structure, since the forced induction device includes the impeller for a rotary machine that has high erosion resistance and a crack suppression function, the life of the forced induction device can be increased.

Furthermore, in a forced induction device according to an eleventh aspect of the present invention, the compressor may be provided on an intake line of an internal combustion engine, the turbine may be adapted to be driven by exhaust gas from the internal combustion engine, and a part of the exhaust gas may be circulated to the intake line on an upstream side of the compressor.

According to this structure, since the forced induction device includes the compressor that has high erosion resistance and a crack suppression function, a long-life forced induction device that can bear up high-speed rotation for a long time can be realized.

Further, a method of manufacturing an impeller for a rotary machine according to a twelfth aspect of the present invention includes: a surface portion-forming step of forming a surface portion, which is provided so as to have a fixed depth from a surface of an impeller body made of Al or Al alloy and have a first compressive residual stress, by performing surface treatment on the surface of the impeller body; and a plated film-forming step of forming a Ni—P-based electroless-plated film, which covers the surface of the impeller body, by an electroless plating method after the surface portion-forming step.

When the Ni—P-based electroless-plated film covering the surface of the impeller body is formed by an electroless plating method after the formation of the surface portion having the first compressive residual stress as described above, the surface portion of the impeller body has the first compressive residual stress. Accordingly, the development of a crack to the impeller body can be suppressed in a case in which the crack is generated in the Ni—P-based electroless-plated film.

Therefore, it is not necessary to frequently change a plating solution into a new Ni—P-based electroless-plating solution and to strictly manage plating conditions in a case in which a Ni—P-based electroless-plating solution (a unique plating solution not available in the market), which allows the quality, structure, and the like of the Ni—P-based electroless-plated film to satisfy predetermined conditions, is used to solve the above-mentioned problems.

That is, since an inexpensive general-purpose Ni—P-based electroless-plating solution can be used, an increase in the costs of the impeller for a rotary machine can be suppressed, the deterioration of productivity of the impeller for a rotary machine can be suppressed, and the development of the crack, which is generated in the Ni—P-based electroless-plated film, to the impeller body can be suppressed.

Furthermore, in a method of manufacturing an impeller for a rotary machine according to a thirteenth aspect of the present invention, shot peening treatment or ultrasonic peening treatment may be used as the surface treatment in the surface portion-forming step.

When shot peening treatment or ultrasonic peening treatment is used as the surface treatment as described above, costs can be reduced and the deformation of the impeller body can be suppressed.

Moreover, in a method of manufacturing an impeller for a rotary machine according to a fourteenth aspect of the present invention, the electroless plating method may be performed in the plated film-forming step so that the Ni—P-based electroless-plated film has a second compressive residual stress.

When the electroless plating method is performed as described above so that the Ni—P-based electroless-plated film has a second compressive residual stress, the generation of a crack in the Ni—P-based electroless-plated film can be suppressed and the growth of a crack can be suppressed in a case in which the crack is generated in the Ni—P-based electroless-plated film. Accordingly, the development of the crack, which is generated in the Ni—P-based electroless-plated film, to the impeller body can be suppressed.

Further, in a method of manufacturing an impeller for a rotary machine according to a fifteenth aspect of the present invention, the surface treatment may be performed in the surface portion-forming step so that an absolute value of the first compressive residual stress is 300 MPa or more and the depth of the surface portion from the surface of the impeller body is equal to or larger than 0.2 mm and less than 0.4 mm.

When the absolute value of the first compressive residual stress is set to 300 MPa or more as described above, the sufficient fatigue life of a blade of the impeller for a rotary machine can be obtained in a case in which the impeller for a rotary machine is applied to a turbocharger.

Furthermore, when the depth of the surface portion is set to be equal to or larger than 0.2 mm and less than 0.4 mm, the amount of deformation of a blade can be made to be in an allowable range in a case in which the impeller for a rotary machine is applied to a turbocharger.

Moreover, in a method of manufacturing an impeller for a rotary machine according to a sixteenth aspect of the present invention, the Ni—P-based electroless-plated film may be formed in the plated film-forming step so that the thickness of the Ni—P-based electroless-plated film is in the range of 15 µm to 60 µm, the concentration of P contained in the Ni—P-based electroless-plated film is in the range of 5 wt % to 10 wt %, and the hardness of the Ni—P-based electroless-plated film is in the range of 500 HV to 700 HV.

When the thickness of the Ni—P-based electroless-plated film is set in the range of 15 µm to 60 µm as described above, costs can be suppressed and sufficient erosion resistance and sufficient crack resistance can be obtained.

Further, when the concentration of P contained in the Ni—P-based electroless-plated film is set in the range of 5 wt % to 10 wt %, high Vickers hardness can be obtained and high crack resistance can be obtained.

Accordingly, the generation of a crack in the Ni—P-based electroless-plated film can be suppressed.

Furthermore, when the hardness of the Ni—P-based electroless-plated film is set in the range of 500 HV to 700 HV, sufficient erosion resistance and sufficient crack resistance can be obtained.

Advantageous Effects of Invention

According to the present invention, an increase in the costs of the impeller for a rotary machine can be suppressed, the deterioration of productivity of the impeller for a rotary machine can be suppressed, and the development of a crack, which is generated in the Ni—P-based electroless-plated film, to the impeller body can be suppressed.

DESCRIPTION OF EMBODIMENTS

Figure 1:
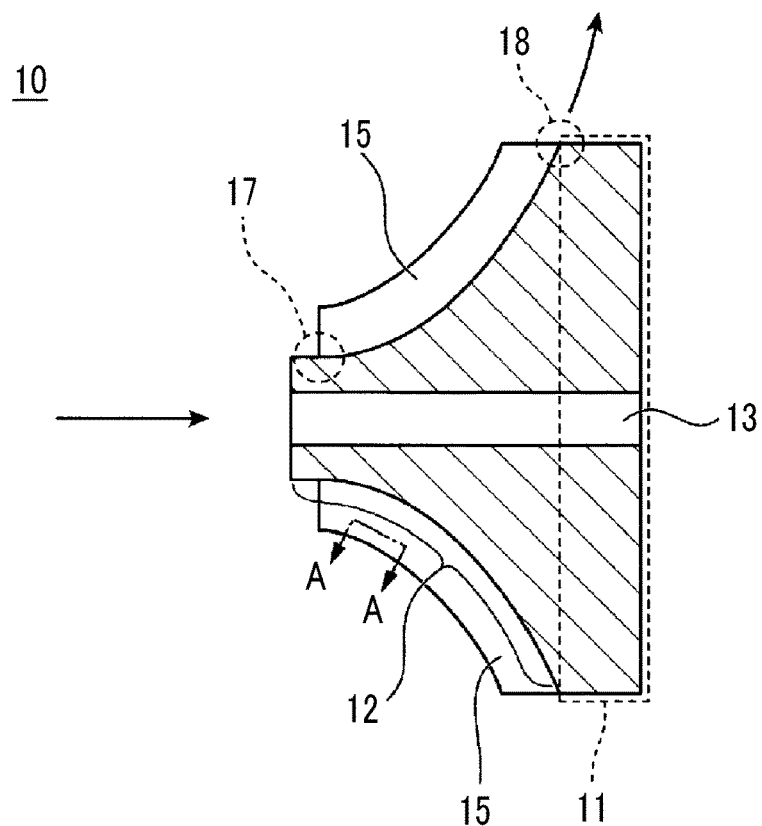
FIG. 1 is a partial cross-sectional view schematically showing an impeller for a rotary machine according to a first embodiment of the present invention.

Several embodiments of the present invention will be described below with reference to the accompanying drawings. However, the dimensions, the materials, the shapes, the relative arrangements, and the like of components described in the embodiments or shown in the drawings are not to limit the scope of the present invention to the embodiments and are merely illustrative examples.

For example, expressions, which represent relative or absolute arrangements, such as "in a certain direction", "along a certain direction", "parallel", "orthogonal", "central", and "concentric" or "coaxial", not only exactly mean such arrangements but also mean a state in which components are relatively displaced with tolerance or angles or distances where the same functions are obtained.

For example, expressions, which represent that objects are in an equal state, such as "the same", "equal", and "homogenous", not only exactly mean an equal state but also mean a state in which tolerance or a difference where the same functions are obtained is present.

For example, an expression, which represents a shape, such as a quadrangular shape or a cylindrical shape, not only means a shape, such as a quadrangular shape or a cylindrical shape, in the strict sense but also means a shape that includes uneven portions, chamfer portions, or the like in a range where the same effects are obtained.

An expression of "comprise", "provided with", "possess", "include, or "have" one component is not an exclusionary expression that excludes the presence of other components.

First Embodiment

FIG. 1 is a partial cross-sectional view schematically showing an impeller for a rotary machine according to a first embodiment of the present invention. In FIG. 1, only a rib 11 and a rotating shaft-insertion portion 12 are shown by a cross-section. Further, an arrow shown in FIG. 1 indicates a direction in which intake air flows.

Figure 2:
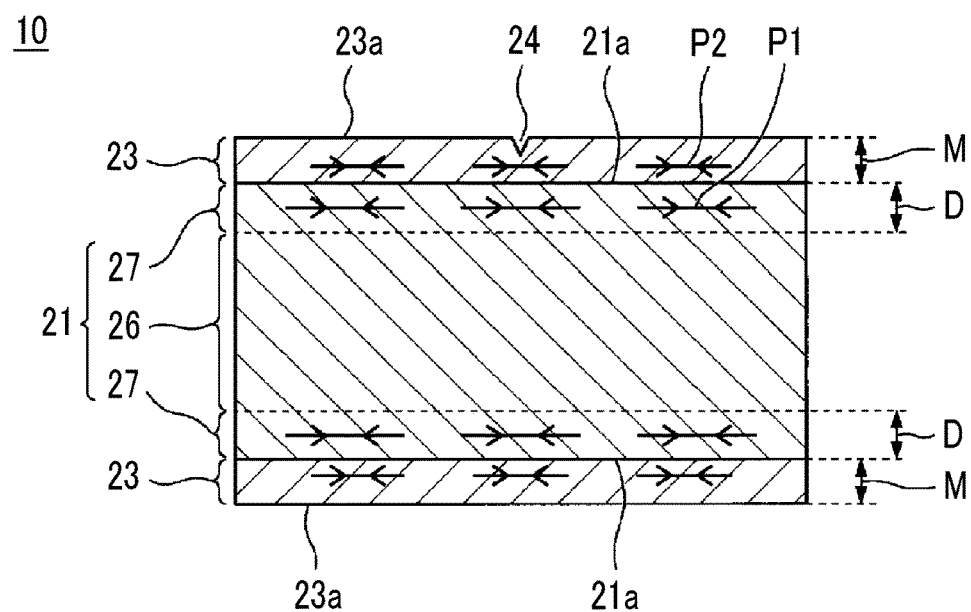
FIG. 2 is a cross-sectional view of the impeller for a rotary machine shown in FIG. 1 taken along line A-A.

FIG. 2 is a cross-sectional view of the impeller for a rotary machine shown in FIG. 1 taken along line A-A. In FIG. 2, an arrow denoted by P1 schematically shows a first compressive residual stress (hereinafter, referred to as a "first compressive residual stress P1") and an arrow denoted by P2 schematically shows a second compressive residual stress (hereinafter, referred to as a "second compressive residual stress P2").

Further, in FIG. 2, M denotes the thickness of a Ni—P-based electroless-plated film 23 provided on a surface 21a of an impeller body 21 (hereinafter, referred to as "thickness M") and D denotes the depth of a surface portion 27 from the surface 21a of the impeller body 21 (hereinafter, referred to as "depth D"). In FIG. 2, the same components as those of FIG. 1 are denoted by the same referenced numerals as those of FIG. 1.

Referring to FIGS. 1 and 2, the impeller 10 for a rotary machine according to the first embodiment includes a disc-shaped rib 11, a rotating shaft-insertion portion 12, a through-hole 13, and a plurality of blades 15, and further includes a blade inlet-root portion 17 and a blade outlet-root portion 18.

The rotating shaft-insertion portion 12 protrudes from the center of the rib 11 in one direction orthogonal to the rib 11. The rotating shaft-insertion portion 12 is formed so as to be reduced in diameter as being away from the rib 11. The rotating shaft-insertion portion 12 is formed integrally with the rib 11.

The through-hole 13 is provided so as to pass through the centers of the rib 11 and the rotating shaft-insertion portion 12. A rotating shaft (not shown) is inserted into the through-hole 13. The impeller 10 for a rotary machine rotates about the rotating shaft.

The plurality of blades 15 are arranged around the rib 11 and the rotating shaft-insertion portion 12 at predetermined intervals. The plurality of blades 15 are formed integrally with the rib 11 and the rotating shaft-insertion portion 12.

The impeller 10 for a rotary machine having the above-mentioned structure includes an impeller body 21 and a Ni—P-based electroless-plated film 23.

The impeller body 21 is made of Al or Al alloy. The impeller body 21 includes surfaces 21a on which the Ni—P-based electroless-plated film 23 is formed.

The impeller body 21 includes surface portions 27 that are provided so as to have a fixed depth D from the surfaces 21a of the impeller body 21, and a middle portion 26 that is disposed inside the surface portions 27.

Each of the surface portions 27 has the first compressive residual stress P1. On the other hand, the middle portion 26 does not have the first compressive residual stress P1. The surface portions 27 and the middle portion 26 are formed integrally with each other.

Since each of the surface portions 27 of the impeller body 21 has the first compressive residual stress P1 as described above, the development of a crack 24 to the impeller body 21 can be suppressed in a case in which the crack 24 is generated in the Ni—P-based electroless-plated film 23.

Accordingly, it is not necessary to frequently change a plating solution into a new Ni—P-based electroless-plating solution and to strictly manage plating conditions in a case in which a Ni—P-based electroless-plating solution (a unique plating solution not available in the market), which allows the quality, structure, and the like of the Ni—P-based electroless-plated film 23 to satisfy predetermined conditions, is used to solve the above-mentioned problems.

That is, since an inexpensive general-purpose Ni—P-based electroless-plating solution can be used, an increase in the costs of the impeller 10 for a rotary machine can be suppressed, the deterioration of productivity of the impeller 10 for a rotary machine can be suppressed, and the development of the crack 24, which is generated in the Ni—P-based electroless-plated film 23, to the impeller body 21 can be suppressed.

It is preferable that the absolute value of the first compressive residual stress P1 is set to, for example, 300 MPa or more.

When the absolute value of the first compressive residual stress P1 is set to 300 MPa or more as described above, the sufficient fatigue life of a blade of the impeller 10 for a rotary machine can be obtained in a case in which the impeller 10 for a rotary machine is applied to a turbocharger.

Further, it is preferable that the depth D of the surface portion 27 is set, for example, to be equal to or larger than 0.2 mm and less than 0.4 mm.

When the depth D of the surface portion 27 is set to be equal to or larger than 0.2 mm and less than 0.4 mm as described above, the amount of deformation of a blade can be made to be in an allowable range in a case in which the impeller 10 for a rotary machine is applied to a turbocharger.

Further, it is preferable that at least the blade inlet-root portion 17 and the blade outlet-root portion 18 of the impeller body 21 include the surface portions 27.

When the blade inlet-root portion 17 and the blade outlet-root portion 18 of the impeller body 21 include the surface portions 27 as described above, it is possible to suppress damage to the blade inlet-root portion 17 and the blade outlet-root portion 18 where a crack 24 is likely to be generated in the Ni—P-based electroless-plated film 23.

The Ni—P-based electroless-plated film 23 is formed so as to cover the surfaces 21a of the impeller body 21.

The Ni—P-based electroless-plated film 23 may have the second compressive residual stress P2.

When the Ni—P-based electroless-plated film 23 has the second compressive residual stress P2 as described above, the growth of a crack 24 in a depth direction can be suppressed in a case in which the crack 24 is generated in the Ni—P-based electroless-plated film 23.

Accordingly, the development of the crack 24, which is generated in the Ni—P-based electroless-plated film 23, to the impeller body 21 can be suppressed.

It is preferable that the concentration of P contained in the Ni—P-based electroless-plated film 23 is set in the range of, for example, 5 wt % to 10 wt %.

When the concentration of P contained in the Ni—P-based electroless-plated film is set in the range of 5 wt % to 10 wt % as described above, high Vickers hardness can be obtained and high crack resistance can be obtained.

Accordingly, the generation of a crack 24 in the Ni—P-based electroless-plated film 23 can be suppressed.

The hardness of the Ni—P-based electroless-plated film 23 may be in the range of, for example, 500 HV to 700 HV.

In a case in which the hardness of the Ni—P-based electroless-plated film 23 is less than 500 HV, there is a concern that sufficient erosion resistance may not be obtained. Further, in a case in which the hardness of the Ni—P-based electroless-plated film 23 is higher than 700 HV, there is a concern that sufficient crack resistance may not be obtained.

Accordingly, when the hardness of the Ni—P-based electroless-plated film 23 is set in the range of 500 HV to 700 HV, sufficient erosion resistance and sufficient crack resistance can be obtained.

It is preferable that the thickness M of the Ni—P-based electroless-plated film 23 is set in the range of, for example, 15 μm to 60 μm.

In a case in which the thickness M of the Ni—P-based electroless-plated film 23 is less than 15 μm, there is a concern that sufficient erosion resistance and sufficient crack resistance may not be obtained. Further, in a case in which the thickness M of the Ni—P-based electroless-plated film 23 is larger than 60 μm, time required for electroless plating treatment is increased. For this reason, there is a concern that costs may be increased.

Accordingly, when the thickness M of the Ni—P-based electroless-plated film 23 is set in the range of 15 μm to 60 μm, costs can be suppressed and sufficient erosion resistance and sufficient crack resistance can be obtained.

According to the impeller 10 for a rotary machine of the first embodiment, as described above, an increase in the costs of the impeller 10 for a rotary machine can be suppressed, the deterioration of productivity of the impeller 10 for a rotary machine can be suppressed, and the development of the crack 24, which is generated in the Ni—P-based electroless-plated film 23, to the impeller body 21 can be suppressed.

Figure 3:
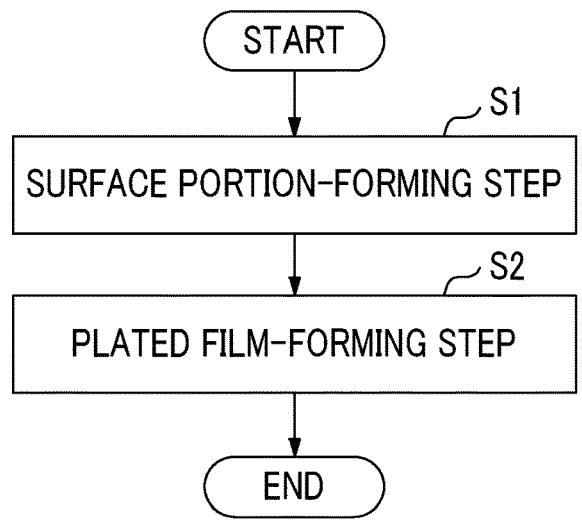
FIG. 3 is a flowchart illustrating a method of manufacturing the impeller for a rotary machine of the first embodiment.

FIG. 3 is a flowchart illustrating a method of manufacturing the impeller for a rotary machine of the first embodiment.

The method of manufacturing the impeller for a rotary machine of the first embodiment will be described with reference to FIGS. 1 to 3.

The method of manufacturing the impeller for a rotary machine of the first embodiment includes: a surface portion-forming step (S1 shown in FIG. 3) of forming the surface portions 27, which are provided so as to have a fixed depth D from the surfaces 21a of the impeller body 21 made of Al or Al alloy and have the first compressive residual stress P1, by performing surface treatment on the surfaces 21a; and a plated film-forming step (S2 shown in FIG. 3) of forming the Ni—P-based electroless-plated film 23, which covers the surfaces 21a of the impeller body 21, by an electroless plating method after the surface portion-forming step.

It is preferable that, for example, shot peening treatment or ultrasonic peening treatment is used as the surface treatment in the surface portion-forming step.

There are various peening treatment methods, a cold working method, and the like as a surface treatment method of imparting the first compressive residual stress P1 to the surface portions 27. However, since it is difficult to apply a cold working method to the impeller body 21 that is applied to a centrifugal compressor and has a complicated shape, a peening treatment method is preferred.

There are, for example, methods, such as a shot peening method, a laser peening method, a water jet peening method, a cavitation peening method, and an ultrasonic peening method, as the peening treatment method.

Since black body paint needs to be applied to an object surface in the laser peening method, costs are increased. For this reason, the laser peening method is not preferred so much.

Further, since impact pressure to be applied to an object surface is high in the cavitation peening method and the water jet peening method, there is a concern that the impeller body 21 having a complicated shape may be deformed. For this reason, the cavitation peening method and the water jet peening method are not preferred so much.

However, in a case in which shot peening treatment or ultrasonic peening treatment is used as the surface treatment, the costs of the impeller 10 for a rotary machine can be reduced and the deformation of the impeller body 21 can be suppressed.

An electroless plating method may be performed in the plated film-forming step so that, for example, the Ni—P-based electroless-plated film 23 has the second compressive residual stress P2.

When an electroless plating method is performed so that the Ni—P-based electroless-plated film 23 has the second compressive residual stress P2 as described above, the growth of a crack 24 can be suppressed in a case in which the crack 24 is generated in the Ni—P-based electroless-plated film 23. Accordingly, the development of the crack 24, which is generated in the Ni—P-based electroless-plated film 23, to the impeller body 21 can be suppressed.

There is a solution, which can form the Ni—P-based electroless-plated film 23 having the second compressive residual stress P2, as an inexpensive general-purpose Ni—P-based electroless-plating solution.

Surface treatment may be performed in the surface portion-forming step so that, for example, the absolute value of the first compressive residual stress P1 is 300 MPa or more and the depth of the surface portion 27 from the surface 21a of the impeller body 21 is equal to or larger than 0.2 mm and less than 0.4 mm.

When the absolute value of the first compressive residual stress P1 is set to 300 MPa or more as described above, the sufficient fatigue life of a blade of the impeller 10 for a rotary machine can be obtained in a case in which the impeller 10 for a rotary machine is applied to a turbocharger.

Further, when the depth of the surface portion 27 is set to be equal to or larger than 0.2 mm and less than 0.4 mm, the amount of deformation of a blade can be made to be in an allowable range in a case in which the impeller 10 for a rotary machine is applied to a turbocharger.

Furthermore, the Ni—P-based electroless-plated film 23 may be formed in the plated film-forming step so that, for example, the thickness of the Ni—P-based electroless-plated film 23 is in the range of 15 μm to 60 μm, the concentration of P contained in the Ni—P-based electroless-plated film 23 is in the range of 5 wt % to 10 wt %, and the hardness of the Ni—P-based electroless-plated film 23 is in the range of 500 HV to 700 HV.

When the thickness M of the Ni—P-based electroless-plated film 23 is set in the range of 15 µm to 60 µm as described above, costs can be suppressed and sufficient erosion resistance and sufficient crack resistance can be obtained.

Further, when the concentration of P contained in the Ni—P-based electroless-plated film 23 is set in the range of 5 wt % to 10 wt %, high Vickers hardness can be obtained and high crack resistance can be obtained.

Accordingly, the generation of a crack 24 in the Ni—P-based electroless-plated film 23 can be suppressed.

Furthermore, when the hardness of the Ni—P-based electroless-plated film 23 is set in the range of 500 HV to 700 HV, sufficient erosion resistance and sufficient crack resistance can be obtained.

According to the method of manufacturing the impeller for a rotary machine of the first embodiment, it is not necessary to frequently change a plating solution into a new Ni—P-based electroless-plating solution and to strictly manage plating conditions in a case in which a Ni—P-based electroless-plating solution (a unique plating solution not available in the market), which allows the quality, structure, and the like of the Ni—P-based electroless-plated film 23 to satisfy predetermined conditions, is used to solve the above-mentioned problems.

That is, since an inexpensive general-purpose Ni—P-based electroless-plating solution can be used, an increase in the costs of the impeller 10 for a rotary machine can be suppressed, the deterioration of productivity of the impeller 10 for a rotary machine can be suppressed, and the development of the crack 24, which is generated in the Ni—P-based electroless-plated film 23, to the impeller body 21 can be suppressed.

Second Embodiment

Figure 4:
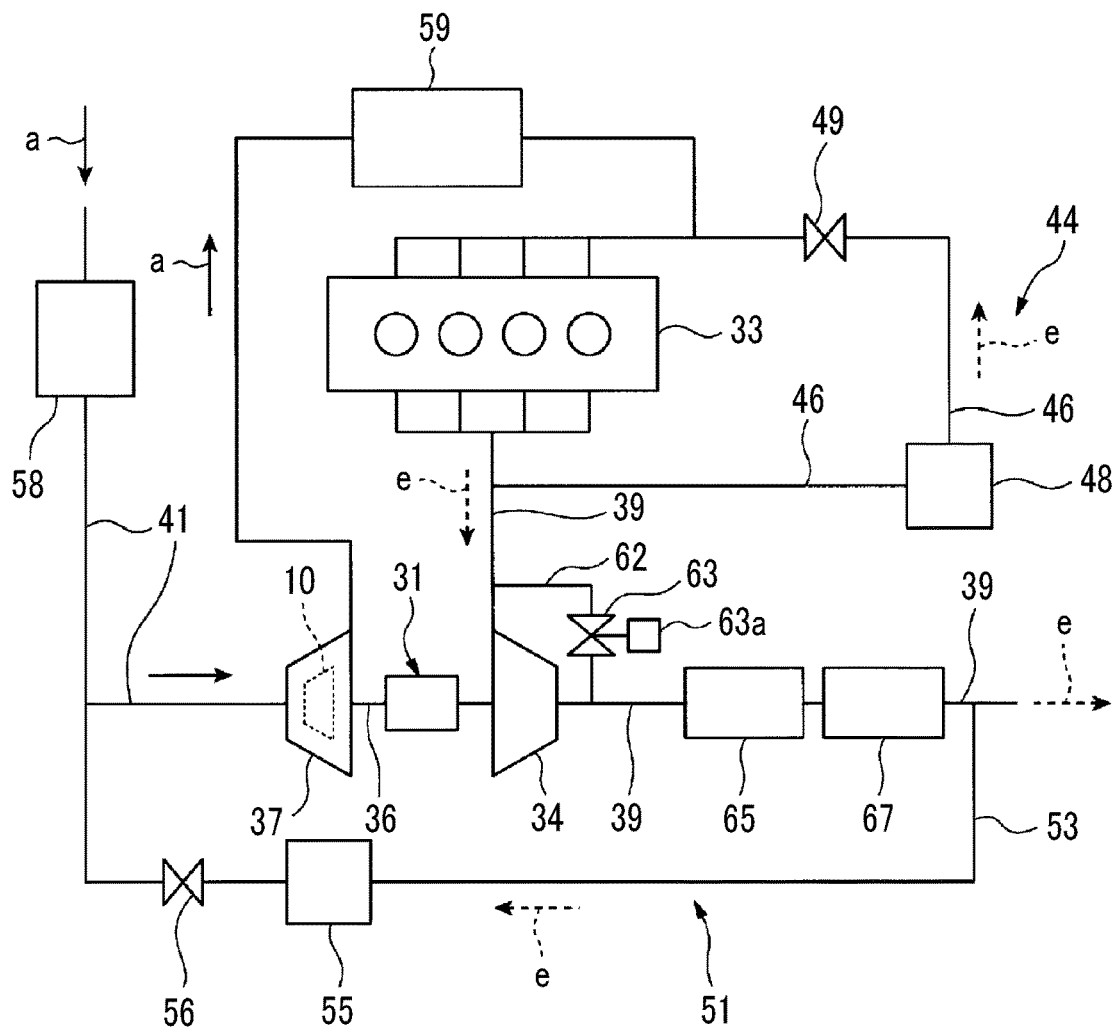
FIG. 4 is a system diagram illustrating a forced induction device according to a second embodiment of the present invention.

FIG. 4 is a system diagram illustrating a forced induction device according to a second embodiment of the present invention. For the convenience of description, components provided around a forced induction device 31 are also shown in FIG. 4. In FIG. 4, "a" denotes intake air (hereinafter, referred to as "intake air a") and "e" denotes exhaust gas (hereinafter, referred to as "exhaust gas e"). Further, in FIG. 4, an arrow shown by a solid line indicates the moving direction of intake air a and an arrow shown by a dotted line indicates the moving direction of exhaust gas e. Furthermore, in FIG. 4, the same components as the structures of FIG. 1 are denoted by the same referenced numerals as those of FIG. 1.

Referring to FIG. 4, the forced induction device 31 according to the second embodiment is applied to an internal combustion engine for a vehicle, for example, a diesel engine 33 employing an EGR system.

The forced induction device 31 includes an exhaust turbine 34 that is rotated by exhaust gas e, a rotating shaft 36, and a compressor 37 that interlocks with the exhaust turbine 34 through the rotating shaft 36. A part of the exhaust gas e is circulated to an intake line 41 that is positioned on the upstream side of the compressor 37.

The exhaust turbine 34 is connected to an exhaust line 39 that is connected to the diesel engine 33. The rotating shaft 36 is fixed to the impeller 10 for a rotary machine by being inserted into the through-hole 13 shown in FIG. 1.

The compressor 37 includes the impeller 10 for a rotary machine shown in FIGS. 1 and 2. The compressor 37 is connected to the intake line 41. The compressor 37 supplies intake air a to the diesel engine 33.

Since the compressor 37 of the second embodiment includes the impeller 10 for a rotary machine that is shown in FIGS. 1 and 2 and has high erosion resistance and a crack suppression function, the life of the compressor 37 can be increased.

A high-pressure EGR system 44 includes a high-pressure EGR line 46 that is branched from the exhaust line 39 on the upstream side of the exhaust turbine 34 and is connected to an intake line 41 positioned on the downstream side of the compressor 37.

In the high-pressure EGR system 44, a part of exhaust gas e discharged from the diesel engine 33 is returned to the intake line 41 through the high-pressure EGR line 46 on the inlet side of the diesel engine 33.

The high-pressure EGR line 46 is provided with an EGR cooler 48 and an EGR valve 49.

A low-pressure EGR system 51 includes a low-pressure EGR line 53 that is branched from the exhaust line 39 on the downstream side of the exhaust turbine 34 and is connected to an intake line 41 positioned on the upstream side of the compressor 37.

In the low-pressure EGR system 51, a part of exhaust gas e discharged from the diesel engine 33 is returned to the intake line 41, which is positioned on the inlet side of the compressor 37, through the low-pressure EGR line 53.

The low-pressure EGR line 53 is provided with an EGR cooler 55 and an EGR valve 56.

An air cleaner 58 is provided on the intake line 41 that is positioned on the upstream side of the compressor 37. An intercooler 59 is provided on the intake line 41 that is positioned on the downstream side of the compressor 37.

An exhaust bypass line 62 is a line that bypasses the exhaust turbine 34, and is connected to the exhaust line 39 across the exhaust turbine 34.

A waste valve 63 is provided on the exhaust bypass line 62. The waste valve 63 includes an actuator 63a that adjusts the opening degree of the waste valve 63.

A DPF filter 65 is provided on the exhaust line 39 that is positioned on the downstream side of the exhaust turbine 34. The DPF filter 65 captures particulate materials that are contained in exhaust gas e.

An oxidation catalyst 67 is provided on the exhaust line 39 positioned on the downstream side of the DPF filter 65. The oxidation catalyst 67 oxidizes $NO_x$, which is contained in exhaust, to $NO_2$, and combusts particulate materials, which are captured by the DPF filter 65, through the oxidation of $NO_2$.

Since the forced induction device 31 of the second embodiment includes the compressor 37 and the exhaust turbine 34 driving the compressor 37, the forced induction device 31 includes the impeller 10 for a rotary machine that has high erosion resistance and a crack suppression function. Accordingly, the life of the forced induction device 31 can be increased.

Preferred embodiments of the present invention have been described above in detail, but the present invention is not limited to the specific embodiments and can have various modifications and changes in various ways without departing from the scope of the present invention disclosed in claims.

Experimental examples will be described below, but the present invention is not limited to the following experimental examples.

Experimental Example 1

In Experimental example 1, four unused compressor wheels, which are made of Al alloy, of an actual machine were prepared as the impeller body 21 shown in FIG. 1 and shot peening treatment was performed on the surfaces of the respective compressor wheels under different conditions.

In the shot peening treatment, glass beads having an average diameter of 150 μm were used as projection materials and were projected with jet pressure in the range of 0.1 to 0.45 MPa. Projection time was set to 10 sec.

In Experimental example 1, the shot peening treatment was performed so that the depth of the surface portion 27 shown in FIG. 2 was about 0.2 mm and the absolute value of the residual stress of the surface portion 27 varied.

After the shot peening treatment, the residual stresses of the blade inlet-root portion 17 and the blade outlet-root portion 18, which were shown in FIG. 1, of the surface portion of each compressor wheel in the depth direction were measured by an X-ray residual stress measuring device. The results thereof are shown in FIG. 5.

Hereinafter, for the convenience of description, an impeller body 21 of which the residual stress at a depth of 0 mm is −100 MPa is referred to as an impeller body B1, an impeller body 21 of which the residual stress at a depth of 0 mm is −200 MPa is referred to as an impeller body B2, an impeller body 21 of which the residual stress at a depth of 0 mm is −300 MPa is referred to as an impeller body B3, and an impeller body 21 of which the residual stress at a depth of 0 mm is −350 MPa is referred to as an impeller body B4. The impeller bodies B1 to B4 are impeller bodies subjected to the shot peening treatment.

Figure 5:
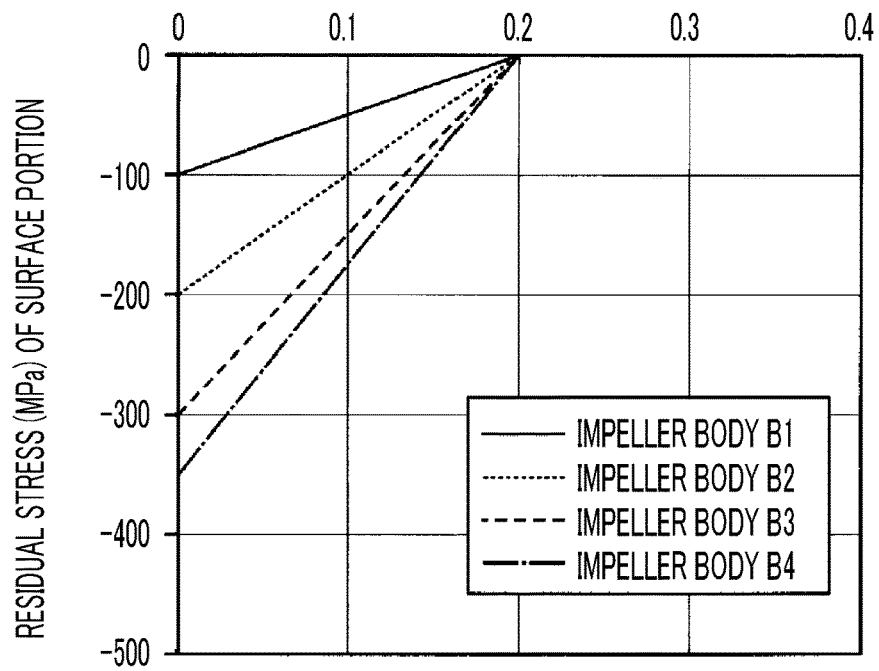
FIG. 5 is a graph showing the distribution of the residual stresses of surface portions of impeller bodies B1 to B4 of Experimental example 1.

FIG. 5 is a graph showing the distribution of the residual stresses of the surface portions of the impeller bodies B1 to B4 of Experimental example 1. The depth of the surface portion from the surface 21a of the impeller body 21 is shown in FIG. 5. Further, each of the residual stresses shown in FIG. 5 is an average residual stress of the residual stress of the blade inlet-root portion 17 and the residual stress of the blade outlet-root portion 18. A case in which that the residual stress is less than 0 means that compressive stress remains, and a case in which the residual stress is larger than 0 means that tensile stress remains.

Next, a Ni—P-based electroless-plated film having a thickness of 20 μm was formed on the surfaces of the impeller bodies B1 to B4 by an electroless plating method using a medium-high-P type electroless Ni—P plating solution that is an inexpensive general-purpose product available in the market.

Conditions of plating treatment, which is to be performed on general aluminum alloy, were used as conditions at the time of electroless plating.

Hereinafter, for the convenience of description, the impeller body B1 on which a Ni—P-based electroless-plated film is formed is referred to as an impeller C1 for a rotary machine, the impeller body B2 on which a Ni—P-based electroless-plated film is formed is referred to as an impeller C2 for a rotary machine, the impeller body B3 on which a Ni—P-based electroless-plated film is formed is referred to as an impeller C3 for a rotary machine, and the impeller body B4 on which a Ni—P-based electroless-plated film is formed is referred to as an impeller C4 for a rotary machine.

Next, blade-fatigue life tests were performed using the impellers C1 to C4 for a rotary machine. A facility for testing the operation of a turbocharger was used as a test device. In this case, the rapid change of the rotational speed of the turbocharger to a low rotational speed from the maximum rotational speed was repeated and the number of times of the change of the rotational speed until damage to the impeller was measured. The results thereof are shown in FIG. 6.

Figure 6:
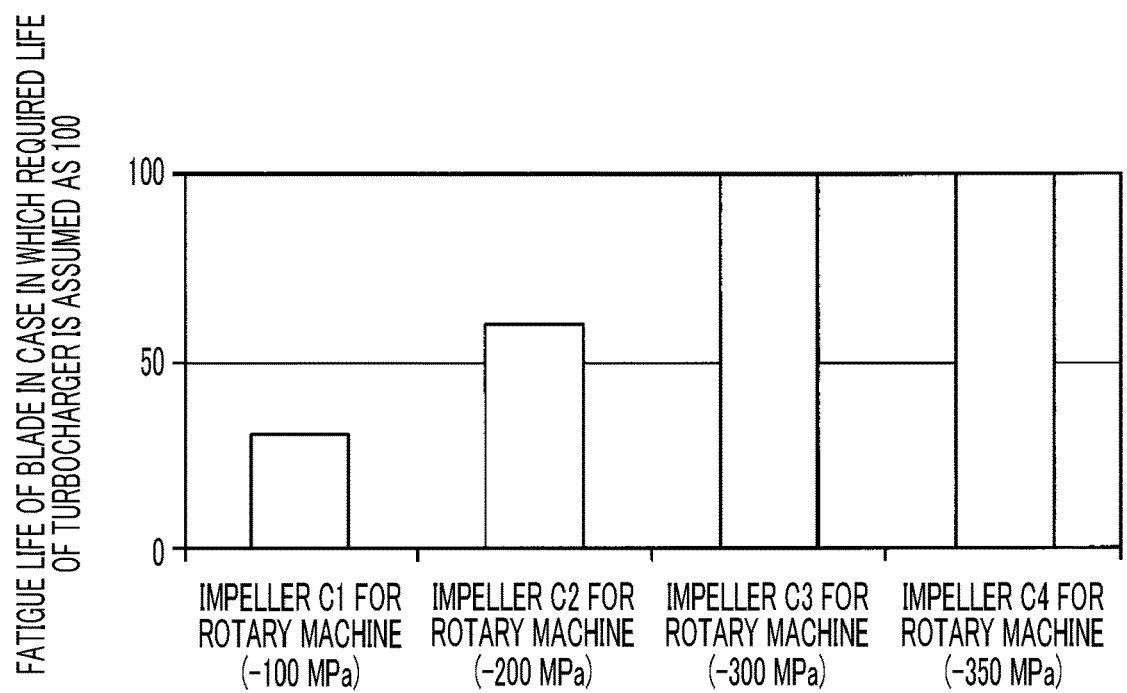
FIG. 6 is a graph showing the fatigue life of a blade of each of impellers C1 to C4 for a rotary machine of Experimental example 1 in a case in which the fatigue life of a blade required for a turbocharger is assumed as 100.

FIG. 6 is a graph showing the fatigue life of a blade of each of the impellers C1 to C4 for a rotary machine of Experimental example 1 in a case in which the fatigue life of a blade required for a turbocharger is assumed as 100.

In FIG. 6, a horizontal axis represents the kind of the impeller for a rotary machine and a vertical axis represents the fatigue life of a blade of each of the impellers C1 to C4 for a rotary machine in a case in which the fatigue life of a blade required for a turbocharger is assumed as 100.

In FIG. 6, the fatigue life of a blade of each of all the impellers for a rotary machine of which the fatigue life of a blade is 100 or more is shown as 100.

From the results of FIGS. 5 and 6, it was found that a residual stress needs to be −300 MPa or more (in other words, a compressive residual stress needs to be 300 MPa or more) to satisfy the fatigue life of a blade required for a turbocharger in a case in which the depth of the surface portion 27 is 0.2 mm.

Experimental Example 2

In Experimental example 2, three unused compressor wheels, which are the same as the compressor wheels of the actual machine used in Experimental example 1, were prepared as the impeller body 21 shown in FIG. 1, shot peening treatment using the same device as the device used in Experimental example 1 was performed, and only jet pressure was changed to make the depth of the surface portion 27 shown in FIG. 2 vary and to set the average residual stresses of the surfaces of the surface portions of the blade inlet-root portion 17 and the blade outlet-root portion 18 to −300 MPa.

Hereinafter, for the convenience of description, an impeller body 21 of which the depth of the surface portion is 0.1 mm is referred to as an impeller body E1, an impeller body 21 of which the depth of the surface portion 27 is 0.2 mm is referred to as an impeller body E2, and an impeller body 21 of which the depth of the surface portion 27 is 0.4 mm is referred to as an impeller body E3. The impeller bodies E1 to E3 are impeller bodies subjected to the shot peening treatment.

After that, the residual stresses of the surface portions 27 of the blade inlet-root portion 17 and the blade outlet-root portion 18 of each of the impeller bodies E1 to E3 in the depth direction were measured by the X-ray residual stress measuring device used in Experimental example 1. The results thereof are shown in FIG. 7.

Figure 7:
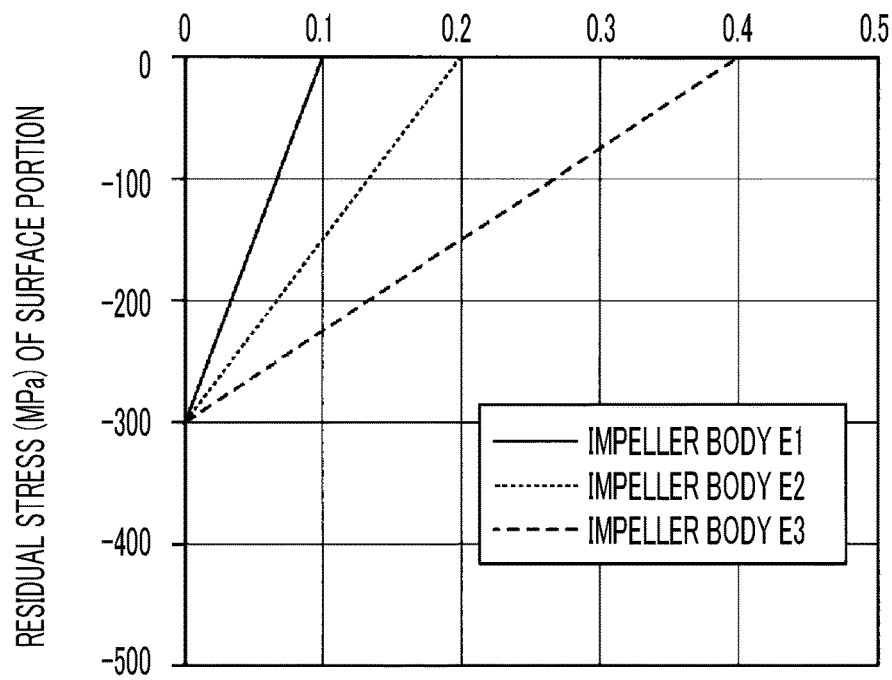
FIG. 7 is a graph showing the distribution of the residual stresses of surface portions of impeller bodies E1 to E3 of Experimental example 2.

FIG. 7 is a graph showing the distribution of the residual stresses of the surface portions of the impeller bodies E1 to E3 of Experimental example 2. The depth of the surface portion from the surface 21a of the impeller body 21 is shown in FIG. 7. Further, each of the residual stresses shown in FIG. 7 is an average residual stress of the residual stress of the blade inlet-root portion 17 and the residual stress of the blade outlet-root portion 18.

Next, a Ni—P-based electroless-plated film having a thickness of 20 μm was formed on the surfaces of the impeller bodies E1 to E3 by an electroless plating method using the same Ni—P-based electroless-plating solution as the plating solution used in Experimental example 1 and the same plating conditions.

Hereinafter, for the convenience of description, the impeller body E1 on which a Ni—P-based electroless-plated film is formed is referred to as an impeller F1 for a rotary machine, the impeller body E2 on which a Ni—P-based electroless-plated film is formed is referred to as an impeller F2 for a rotary machine, and the impeller body E3 on which a Ni—P-based electroless-plated film is formed is referred to as an impeller F3 for a rotary machine.

Next, blade-fatigue life tests for the impellers F1 to F3 for a rotary machine were performed using the same test device as the test device used in Experimental example 1. The results thereof are shown in FIG. 8.

Figure 8:
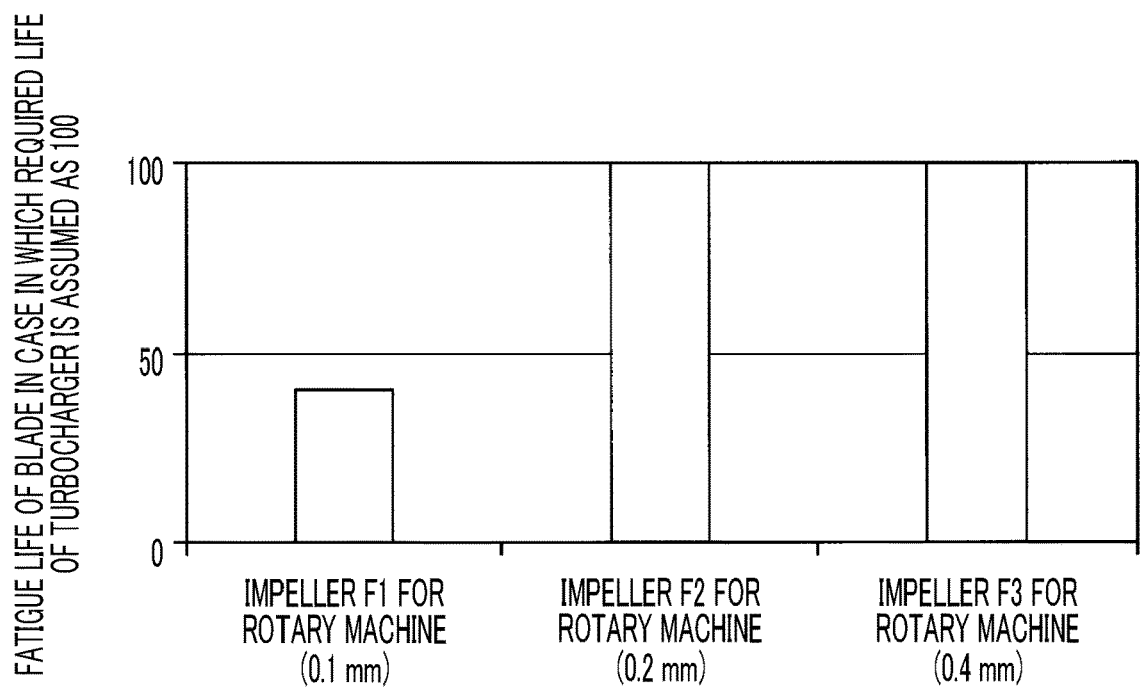
FIG. 8 is a graph showing the fatigue life of a blade of each of impellers F1 to F3 for a rotary machine of Experimental example 2 in a case in which the fatigue life of a blade required for a turbocharger is assumed as 100.

FIG. 8 is a graph showing the fatigue life of a blade of each of the impellers F1 to F3 for a rotary machine of Experimental example 2 in a case in which the fatigue life of a blade required for a turbocharger is assumed as 100.

In FIG. 8, a horizontal axis represents the kind of the impeller for a rotary machine and a vertical axis represents the fatigue life of a blade of each of the impellers F1 to F3 for a rotary machine in a case in which the fatigue life of a blade required for a turbocharger is assumed as 100.

In FIG. 8, the fatigue life of a blade of each of all the impellers for a rotary machine of which the fatigue life of a blade is 100 or more is shown as 100.

From the results of FIGS. 7 and 8, it was found that the depth of the surface portion 27 needs to be 0.2 mm or more to satisfy the fatigue life of a blade required for a turbocharger.

Experimental Example 3

In Experimental example 3, two unused compressor wheels, which are the same as the compressor wheels of the actual machine used in Experimental example 1, were prepared as the impeller body 21 shown in FIG. 1, and the dimensions of impeller bodies not yet subjected to shot peening treatment were acquired.

After that, shot peening treatment using the same device as the device used in Experimental example 1 was performed and only jet pressure was changed to make the depth of the surface portion 27 shown in FIG. 2 vary and to set the average residual stress of the surfaces of the surface portions 27 of the blade inlet-root portion 17 and the blade outlet-root portion 18 to −300 MPa.

Hereinafter, for the convenience of description, an impeller body 21 of which the depth of the surface portion 27 is 0.2 mm is referred to as an impeller body G1, and an impeller body 21 of which the depth of the surface portion 27 is 0.4 mm is referred to as an impeller body G2. The impeller bodies G1 and G2 are impeller bodies subjected to the shot peening treatment.

After that, the dimensions of portions of the impeller bodies G1 and G2 corresponding to the same portions as the portions of which the dimensions had been measured before the shot peening treatment were acquired, and a variation in the dimensions of the impeller bodies between before and after the shot peening treatment was obtained. A variation in the dimensions was measured by a non-contact three-dimensional measurement device before and after the shot peening treatment.

Figure 10:
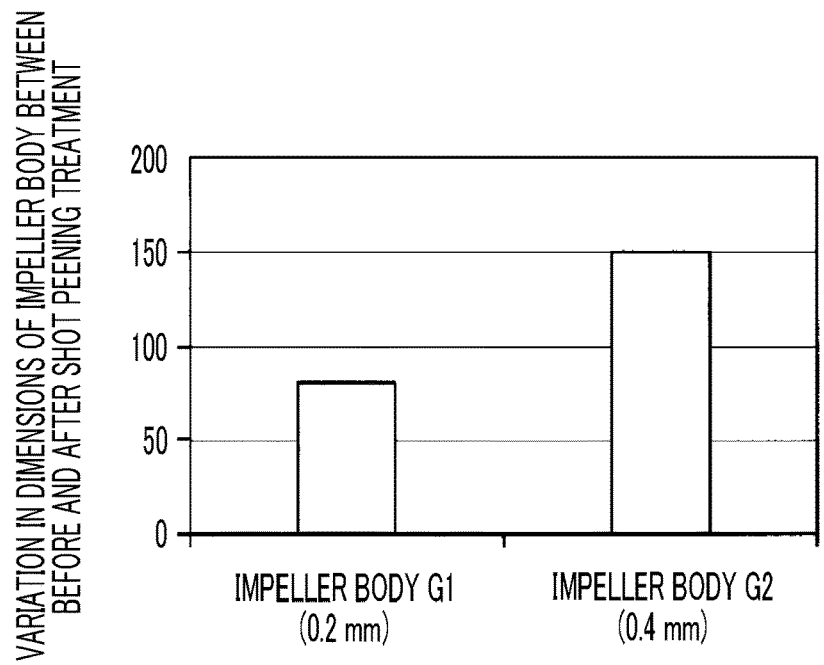
FIG. 10 is a graph showing a variation in the dimensions of the impeller bodies G1 and G2 of Experimental example 3 between before and after shot peening treatment.

The results thereof are shown in FIG. 10.

FIG. 10 is a graph showing a variation in the dimensions of the blades of the impeller bodies G1 and G2 of Experimental example 3 between before and after the shot peening treatment.

In FIG. 10, a horizontal axis represents the kind of the impeller body and a vertical axis represents a variation in the dimensions of the blades of the impeller bodies G1 and G2 between before and after the shot peening treatment.

In FIG. 10, it is determined that the blades of the impeller bodies satisfy the design allowable value of a turbocharger in a case in which a variation in the dimensions is 100 or less, and it is determined that the blades of the impeller bodies do not satisfy the design allowable degree of a turbocharger in a case in which a variation in the dimensions is 100 or more.

Figure 9:
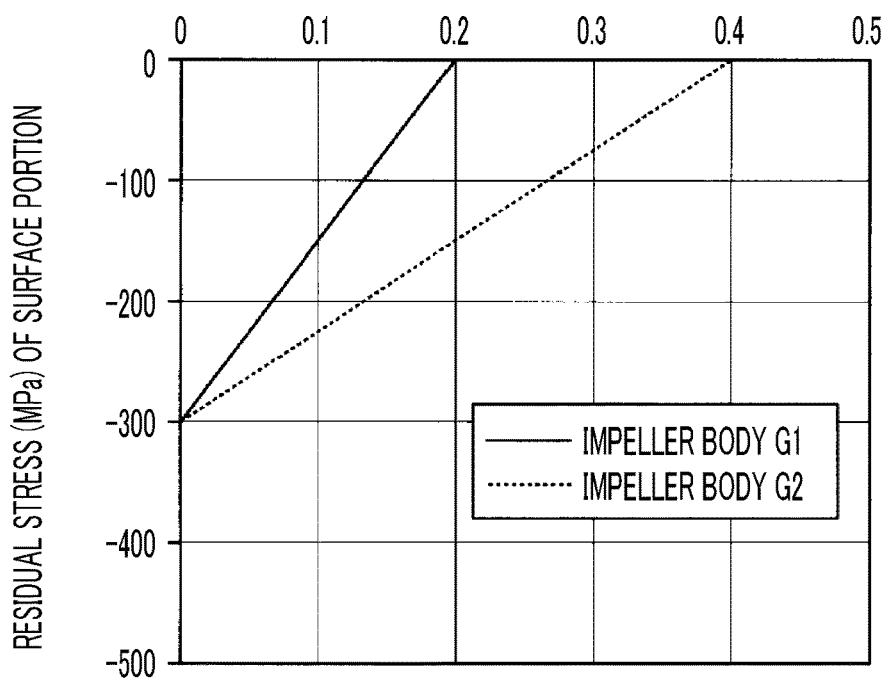
FIG. 9 is a graph showing the distribution of the residual stresses of surface portions of impeller bodies G1 and G2 of Experimental example 3.

From the results of FIGS. 9 and 10, it was found that the depth of the surface portion 27 shown in FIG. 1 needs to be set to be less than 0.4 mm to allow a variation in the dimensions of the blades of the impeller bodies to satisfy the design allowable degree of a turbocharger.

It was confirmed that the blades of the impeller body G2 are deformed since the collision pressure of projection materials at the time of shot peening treatment is high.

Experimental Example 4

In Experimental example 4, five unused compressor wheels, which are the same as the compressor wheels of the actual machine used in Experimental example 1, were prepared as the impeller body 21 shown in FIG. 1.

Shot peening treatment using the same device as the device used in Experimental example 1 was performed on the five compressor wheels. Accordingly, five compressor wheels of which the depth of the surface portion 27 is set to 0.2 mm and the residual stress of the surface is set to −200 MPa were prepared.

Hereinafter, for the convenience of description, the five compressor wheels including the surface portions 27 are referred to as compressor wheels H1 to H5.

Figure 11:
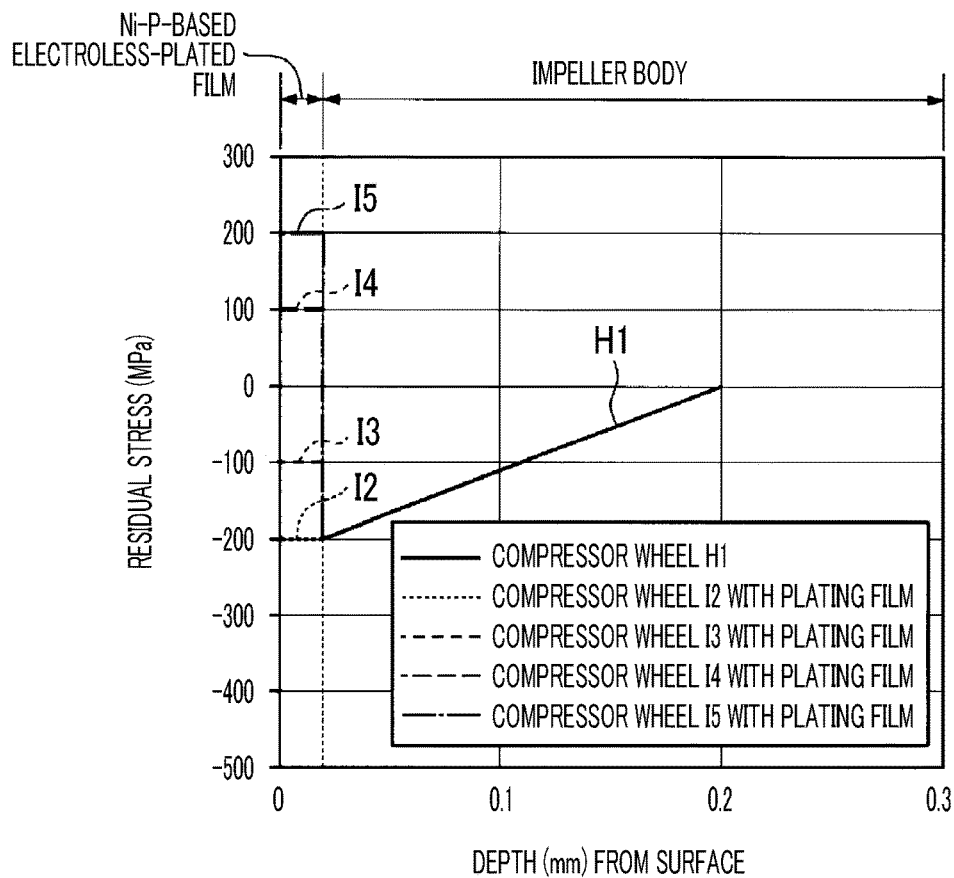
FIG. 11 is a graph showing the residual stresses of compressor wheels H1 and I2 to I5.

The results of measurement of the residual stress of the surface portion 27 of the compressor wheel H1, which is performed using the same X-ray residual stress measuring device as the X-ray residual stress measuring device used in Experimental example 1, are shown in FIG. 11. The results of measurement of the residual stress of Ni—P-based electroless-plated films of compressor wheels I2 to I5 to be described later are also shown in FIG. 11 together.

FIG. 11 is a graph showing the residual stresses of the compressor wheels H1 and I2 to I5.

After that, Ni—P-based electroless-plated films having a thickness of 20 μm were formed on the surfaces of the four compressor wheels H2 to H5 with a change in the kind of a plating solution by an electroless plating method to manufacture compressor wheels with plating films (hereinafter, referred to as compressor wheels I2 to I5).

The Ni—P-based electroless-plated film of the compressor wheel I2 was formed using a medium-high-P type electroless plating solution of which the stress of a plated film was adjusted to "−100 MPa" by an additive. The Ni—P-based electroless-plated film of the compressor wheel I3 was formed using a medium-high-P type electroless plating solution of which the stress of a plated film was adjusted to "−200 MPa" by an additive. The Ni—P-based electroless-plated film of the compressor wheel I4 was formed using a medium-high-P type electroless plating solution of which the stress of a plated film was adjusted to "+100 MPa" by an additive.

The Ni—P-based electroless-plated film of the compressor wheel I5 was formed using a medium-high-P type electroless plating solution of which the stress of a plated film was adjusted to "+200 MPa" by an additive.

After that, the residual stresses of the Ni—P-based electroless-plated films of the compressor wheels I2 to I5 were measured using the same method as the method used in Experimental example 1 by the X-ray residual stress measuring device. The results thereof are shown in FIG. 11.

Then, rotational speed-change tests for the compressor wheels H1 and I2 to I5 were performed by a test device that changes a rotational speed.

In the rotational speed-change test, a step of maintaining the maximum rotational speed for a predetermined time and a step of setting a rotational speed to the minimum rotational speed were repeated.

After that, the fatigue life of a blade in a case in which the required life of a turbocharger is assumed as 100 was obtained by the same method as the method used in Experimental example 1. The results thereof are shown in FIG. 12.

Figure 12:
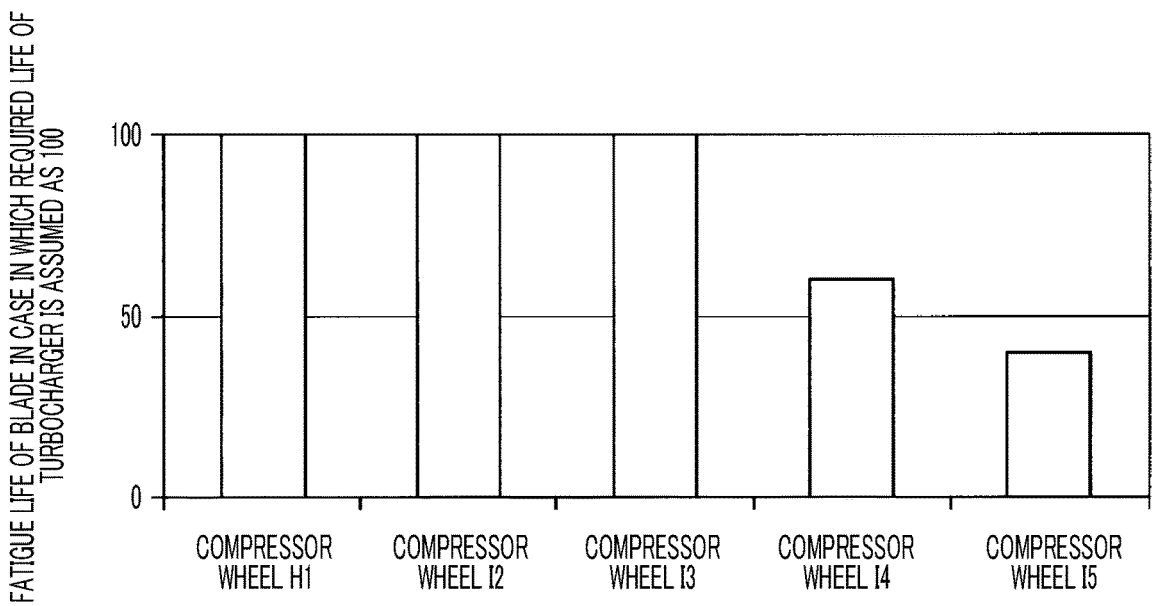
FIG. 12 is a graph showing the fatigue life of a blade of each of the compressor wheels H1 and I2 to I5 in a case in which the fatigue life of a blade required for a turbocharger is assumed as 100.

FIG. 12 is a graph showing the fatigue life of a blade of each of the compressor wheels H1 and I2 to I5 in a case in which the fatigue life of a blade required for a turbocharger is assumed as 100.

Referring to FIG. 11, it was found that the Ni—P-based electroless-plated films of the compressor wheels I2 and I3 have a compressive residual stress. Further, it was found that the Ni—P-based electroless-plated films of the compressor wheels I4 and I5 have a tensile residual stress.

Further, from FIGS. 11 and 12, it was confirmed that the Ni—P-based electroless-plated film formed on the compressor wheel needs to have not a tensile residual stress but a compressive residual stress in a case in which the compressor wheel is applied to a turbocharger.

INDUSTRIAL APPLICABILITY

The present invention can be applied to an impeller for a rotary machine, a compressor including the impeller for a rotary machine, a forced induction device including the impeller for a rotary machine, and a method of manufacturing the impeller for a rotary machine.

REFERENCE SIGNS LIST

10: impeller for rotary machine
11: rib
12: rotating shaft-insertion portion
13: through-hole
15: blade
17: blade inlet-root portion
18: blade outlet-root portion
21: impeller body
21a, 23a: surface
23: Ni—P-based electroless-plated film
24: crack
26: middle portion
27: surface portion
31: forced induction device
33: diesel engine
34: exhaust turbine
36: rotating shaft
37: compressor
39: exhaust line
41: intake line
44: high-pressure EGR system
46: high-pressure EGR line
48: EGR cooler
49: EGR valve
51: low-pressure EGR system
53: low-pressure EGR line
55: EGR cooler
56: EGR valve
58: air cleaner
59: intercooler
62: exhaust bypass line
63: waste valve
63a: actuator
65: DPF filter
67: oxidation catalyst
D: depth
e: exhaust gas
M: thickness
P1: first compressive residual stress
P2: second compressive residual stress

The invention claimed is:

1. An impeller for a rotary machine comprising:
   an impeller body that includes a surface portion provided so as to have a fixed depth from a surface thereof and is made of Al or Al alloy; and
   a Ni—P-based electroless-plated film that covers the surface of the impeller body,
   wherein the surface portion has a first compressive residual stress,
   an absolute value of the first compressive residual stress is 300 MPa or more,
   the depth of the surface portion from the surface of the impeller body is equal to or larger than 0.2 mm and less than 0.4 mm,
   the impeller body includes a blade inlet-root portion and a blade outlet-root portion, and
   each of the blade inlet-root portion and the blade outlet-root portion includes the surface portion.

2. The impeller for a rotary machine according to claim 1, wherein the Ni—P-based electroless-plated film has a second compressive residual stress.

3. The impeller for a rotary machine according to claim 2, wherein a concentration of P contained in the Ni—P-based electroless-plated film is in the range of 5 wt % to 10 wt %.

4. The impeller for a rotary machine according to claim 2, wherein a hardness of the Ni—P-based electroless-plated film is in the range of 500 HV to 700 HV.

5. The impeller for a rotary machine according to claim 2, wherein a thickness of the Ni—P-based electroless-plated film is in the range of 15 μm to 60 μm.

6. The impeller for a rotary machine according to claim 1, wherein a concentration of P contained in the Ni—P-based electroless-plated film is in the range of 5 wt % to 10 wt %.

7. The impeller for a rotary machine according to claim 6, wherein a hardness of the Ni—P-based electroless-plated film is in the range of 500 HV to 700 HV.

8. The impeller for a rotary machine according to claim 6, wherein a thickness of the Ni—P-based electroless-plated film is in the range of 15 μm to 60 μm.

9. The impeller for a rotary machine according to claim 1, wherein a hardness of the Ni—P-based electroless-plated film is in the range of 500 HV to 700 HV.

10. The impeller for a rotary machine according to claim 9, wherein a thickness of the Ni—P-based electroless-plated film is in the range of 15 μm to 60 μm.

11. The impeller for a rotary machine according to claim 1, wherein a thickness of the Ni—P-based electroless-plated film is in the range of 15 μm to 60 μm.

12. The impeller for a rotary machine according to claim 1, wherein the impeller body is an impeller body for a forced induction device.

13. A compressor comprising:
the impeller for a rotary machine according to claim 1.

14. A forced induction device comprising:
the compressor according to claim 13; and
a turbine that drives the compressor.

15. The forced induction device according to claim 14,
wherein the compressor is provided on an intake line of an internal combustion engine,
the turbine is adapted to be driven by exhaust gas from the internal combustion engine, and
a part of the exhaust gas is circulated to the intake line on an upstream side of the compressor.

16. A method of manufacturing an impeller for a rotary machine, the method comprising:
a surface portion-forming step of forming a surface portion, which is provided so as to have a fixed depth from a surface of an impeller body made of Al or Al alloy and have a first compressive residual stress, by performing surface treatment on the surface of the impeller body; and
a plated film-forming step of forming a Ni—P-based electroless-plated film, which covers the surface of the impeller body, by an electroless plating method after the surface portion-forming step,
wherein in the surface portion-forming step, glass beads are used as projection materials and the projection materials are projected with jet pressure in the range of 0.1 to 0.45 MPa to from the surface portion on a blade inlet-root portion and a blade outlet-root portion of the impeller body.

17. The method of manufacturing an impeller for a rotary machine according to claim 16,
wherein the electroless plating method is performed in the plated film-forming step so that the Ni—P-based electroless-plated film has a second compressive residual stress.

18. The method of manufacturing an impeller for a rotary machine according to claim 16,
wherein the surface treatment is performed in the surface portion-forming step so that an absolute value of the first compressive residual stress is 300 MPa and the depth of the surface portion from the surface of the impeller body is equal to or larger than 0.2 mm and less than 0.4 mm.

19. The method of manufacturing an impeller for a rotary machine according to claim 16,
wherein the Ni—P-based electroless-plated film is formed in the plated film-forming step so that the thickness of the Ni—P-based electroless-plated film is in the range of 15 µm to 60 µm, the concentration of P contained in the Ni—P-based electroless-plated film is in the range of 5 wt % to 10 wt %, and the hardness of the Ni—P-based electroless-plated film is in the range of 500 HV to 700 HV.

* * * * *